(12) United States Patent
Hvolka et al.

(10) Patent No.: US 7,537,536 B2
(45) Date of Patent: May 26, 2009

(54) TWO SPEED GEARBOX

(76) Inventors: Dusan J. Hvolka, 3115 E. Lion La., #160, Salt Lake City, UT (US) 84121; Patrick Hvolka, 3115 E. Lion La., #160, Salt Lake City, UT (US) 84121

( * ) Notice: Subject to any disclaimer, the term of this patent is extended or adjusted under 35 U.S.C. 154(b) by 343 days.

(21) Appl. No.: 11/510,024

(22) Filed: Aug. 26, 2006

(65) Prior Publication Data

US 2007/0287575 A1 Dec. 13, 2007

Related U.S. Application Data

(60) Provisional application No. 60/813,329, filed on Jun. 13, 2006.

(51) Int. Cl.
*F16H 31/00* (2006.01)
(52) U.S. Cl. ................. 475/146; 475/319; 475/322; 192/3.52; 192/85 AA
(58) Field of Classification Search .............. 475/5, 475/58, 116, 118, 146, 275, 276, 317, 319, 475/322; 192/3.52, 85 AA
See application file for complete search history.

(56) References Cited

U.S. PATENT DOCUMENTS

| | | | |
|---|---|---|---|
| 4,178,814 A | 12/1979 | Ahlen | |
| 4,331,432 A | 5/1982 | Blanchard | |
| 4,400,998 A * | 8/1983 | Bookout et al. | ............... 475/71 |
| 5,006,100 A | 4/1991 | Brandt et al. | |
| 5,024,636 A * | 6/1991 | Phebus et al. | ............... 475/141 |
| 5,478,290 A | 12/1995 | Buuck et al. | |
| 5,509,860 A | 4/1996 | Legner | |
| 6,350,165 B1 | 2/2002 | Neisen | |
| 6,612,961 B2 * | 9/2003 | Ohkubo et al. | .............. 475/319 |
| 6,843,750 B1 | 1/2005 | Bennett | |
| 6,935,986 B2 | 8/2005 | Hvolka et al. | |

\* cited by examiner

*Primary Examiner*—David D. Le
(74) *Attorney, Agent, or Firm*—Marcus G. Theodore

(57) ABSTRACT

A universal two speed gearbox for driving high speed vehicles under high temperature operating conditions, and other devices which require variable operating two speed bearing thrust.

12 Claims, 8 Drawing Sheets

TWO SPEED GEARBOX

RELATED APPLICATIONS

This patent application is a continuation-in-part of the provisional patent application entitled "Improved Two Speed Gearbox filed Jun. 13, 2006, Ser. No. 60/813,329.

BACKGROUND OF THE INVENTION

1. Field

The present invention relates generally to gearboxes, and more particularly, to a universal two speed gearbox for driving high speed vehicles under high temperature operating conditions, and other devices which require variable operating two speed bearing thrust.

2. State of the Art

A number of gearboxes and transmission wheel hubs are known. For example, Pitts, Hvolka et al, U.S. Pat. No. 6,935,986 B2 discloses a two speed Gear Box. The Pitts/Hvolka et al Two Speed Gear Box axial force hydraulically developed by the piston is transmitted to the high speed clutch by a large ball bearing. On the other side of the gear box, the piston is supported by another ball bearing. This Pitts/Hvolka et al design is suitable for 150 horsepower operation. Operation of Pitts/Hvolka et al for long periods at 400 horsepower in the high speed mode shifts the entire gearing assembly against the thrust bearing shown in FIG. 1 overloading the bearing by the axial force. This causes added wear and heat buildup which unfavorably influences the bearing service life and reliability of this 2-speed gear box. The new design described below provides an improved Two Speed Gear Box capable of operating more like a transmission at higher horsepower and high speeds in climates where the temperatures routinely exceed 100 degrees.

Buck et al., U.S. Pat. No. 5,478,290 discloses a two speed high shift transmission residing within a rotatable wheel hub. It has dual hydraulic clutches to activate select gears of a planetary gear set including a first sun gear, a first planet gear, a first planet carrier and an inner ring gear. The first planet carrier includes a gear, which drives a second planetary gear set resulting in rotation of a wheel hub. When the first clutch is engaged, the inner ring gear is locked to a stationary outer ring effecting a high ratio reduction. When pressure to the first clutch is removed and applied to the second clutch, said first clutch disengages and said second clutch engages the sun gear and the planet carrier locking them together so that the sun gear, planet gear and planet carrier and inner ring gear rotate in unison effecting a low ratio reduction. Buuck et al may also incorporate a second planetary gear system operably associated with the hub to be selectively be engaged. The Buuck invention requires exterior dynamic seals, which are subject to leakage, and is subject to large clutch or brake forces exerted upon rotary bearings. This requires large design of the transmission and bearings to withstand such clutch and brake forces Blanchard, U.S. Pat. No. 4,331,432 discloses a two speed automatic transmissions for marine propulsion. It employs an hydraulically actuated two speed transmission with a single fluid multi-pressure actuated clutch for activating different output shafts.

Brandt et al, U.S. Pat. No. 5,006,100 discloses a two-speed planetary gear mechanism employing an hydraulically actuated piston to activate the ring gear of a planetary gear system in either one or two directions. It does not employ a clutch for smoother operation.

Nelson, U.S. Pat. No. 6,350,165B1 discloses a marine stem drive two-speed automatic transmission employing a planetary gear apparatus including two hydraulic clutches and a ring gear brake to provide two forward drive ratios, a reverse ratio, or a neutral ratio. In another embodiment, a third hydraulic clutch is included with bevel gears alone to provide two forward and reverse speeds.

Legner, U.S. Pat. No. 5,509,860 discloses a power shift two-speed epicyclical gear box employing two hydraulically engaged friction clutches, which are alternatively engaged and disengaged by the force exerted by plate springs or hydraulic pistons. An accumulator and a check valve system are associated with the pressure chambers of the friction clutches to improve the shifting quality, particularly when downshifted from second to first gear.

Ahlen, U.S. Pat. No. 4,178,814 discloses a two-speed gear transmission employing a direct drive connectable clutch wherein the input and output shafts rotate together and a second gear drive namely overdrive or under drive have one of the sun or ring hears held stationary by a brake relative to the casing.

Co-applicant, Dusan Hvolka's co-pending filing with Strong et al. entitled "Two Speed Gearbox" discloses a two speed planetary gearbox activated by inboard and outboard clutches each associated with its own separate planetary gear system located and controlled in the wheel hub of the axle. In the low range, it employs a static clutch. In the high range it employs a dynamic clutch sealed with dynamic seals, which leak as the pressure increases; thereby requiring at high pressures a pump to remove excess fluids.

Cited for general interest is Bennett, U.S. Pat. No. 6,843,750 disclosing a two speed gearbox with integrated differential employing a differential spider.

Other two speed shiftable gearboxes have short bearing lives when the two speed gearbox is operated for long periods of time in high range. This is because there is a large thrust load on the thrust bearing between the High Range Apply Piston and the High Clutch. All applications will be torque limited in the high range due to the limitations of the input horsepower. This results in a lower required input torque as the input speed to the box increases. Since the required thrust load through the bearing is directly proportional to the torque, and since the life of the bearing is a function of the thrust load, an increase bearing life will result from reducing the thrust load on the bearing.

The invention described below provides an improved two speed gearbox for operating at high speeds and temperatures employing a piston relocated to the planet carrier of the planetary gears to hydraulically engage the high speed clutch. It is activated with a non-rotating piston used to apply the force required to activate the high-speed clutch using a locking pin and a thrust bearing to allow the piston to secure the sun gear of a planetary gear system to remain in a high operating range, and a second low-speed clutch securing the ring gear of the planetary gear system in the low operating range.

SUMMARY OF THE INVENTION

The invention comprises a two speed gearbox, which provides a static gearing system that will actively lower the thrust on support bearings by reducing the apply pressure to the clutch. The two speed gearbox includes a casing adapted to journal mount about a splined input drive shaft and a splined output shaft with coupling structure on either side of a central planetary gear carrier mount assembly. The central planetary gear carrier mount assembly comprises: a sun gear driven by the drive shaft; a plurality of planetary gears; a ring gear; and a planetary gear carrier, the planetary gear carrier supporting and interconnecting the planetary gears. A low speed clutch is mounted to the gearbox casing proximate the planetary gears and adapted to selectively engage a low speed clutch pack operably associated with the rotating ring gear of the central planetary gear assembly. Activation via an engaging/disengaging low speed static piston minimizes vibration of the entire low speed clutch assembly.

A high speed clutch to selectively engage clutch plates of the sun gear of the planetary gear assembly is attached to the gearbox casing. An engaging/disengaging high speed piston is mounted on the planetary gear of the planetary gear assembly carrier near the corresponding static clutch plates. The high speed piston then selectively engages the high speed clutch plates having a locking pin to secure the sun gear assembly to the casing to prevent slippage. When activated, it secures the sun gear of the planetary gear carrier when engaged.

The high speed clutch piston is located in the in the planetary gear carrier mount assembly on the gear box output side, which hydraulically engages the high speed clutch. The piston was relocated to the planet carrier of the planetary gears to provide zero force thrust against a snap ring assembly. The piston engaging the high speed clutch is located on the planet carrier so that the axial force developed by the piston is transmitted to the planet carrier and becomes its internal force and does not develop axial force loading the gear box to overload bearings. This results in eliminating the axial force of the Pitts/Hvolka et al, U.S. Pat. No. 6,935,986 B2 Two Speed Gear Box developed by the piston during the high speed run, which pushed the whole planetary gear to the bearing input flange as shown in FIG. 1.

Coupled with the relocation of the low speed clutch to minimize vibration, the relocated high speed piston in the planetary gear carrier mount assembly provides an improved two speed gear box with significantly improved operating performance.

Pressured oil is delivered to the high speed clutch piston from the manifold placed on the gear box housing through the feed ditch in the housing and flange. This pressured oil is brought through the hardened bushing and high pressure iron dynamic seals or aluminum bushing and Teflon seals to the planet carrier and then to the high speed clutch. Pressured oil to the low speed clutch is delivered directly to the piston of the low speed clutch without dynamic seals. This low speed piston allows reduced gear bracing placed in the flange. Consequently, this clutch does not require carrier and sun gear bearing bracing when the Two Speed Gear Box is high speed shifted.

The high speed and low speed clutches are activated with selective activation means, such as an hydraulic circuit, to selectively activate the desired high speed and/or low speed pistons to provide the desired output operating speed mode to the output shaft. Selective engagement of the above components of the planetary gear assembly defines a plurality of operating modes: 1) a neutral mode defined by disengaging both the low speed clutch and the high speed clutch; 2) a low speed mode defined by engaging the low speed clutch and disengaging the high speed clutch; and 3) a high speed mode defined by disengaging the low speed clutch and engaging the high speed clutch. Preferably, at least one of the low speed clutch and the high speed clutch is adapted to be engaged and disengaged automatically.

The two speed gearbox is associated with a drive axle driven by a hydrostatic drive system, although it could be adapted for use with combustion and electric motors. In one preferred embodiment, the carrier mount houses the planetary gear assembly to be engaged by the clutch assemblies. The carrier mount preferably has a generally cylindrical interior surface, a portion of the exterior surface defining the ring gear of the planetary gear assembly. The two speed gearbox has a plurality of planetary gears of the planetary gear assembly carrier mount operatively connected to the sun gear of the planetary gear assembly, such that the sun gear rotates about a drive axis in conjunction with the gear carrier of the planetary gear assembly. The ring gear of the planetary gear assembly forms a portion of the carrier mount and provides a two speed gear box with a gear ratio of between approximately 2 to 3.6, when a single planetary gear assembly carrier is employed and is driven by the outputs provided by its planetary gears.

For higher gear ratios greater than 3, instead of relying solely on the output generated by a single set of planetary gears, the two speed gear box may include a carrier mount with a dual segmented planetary gear assembly adapted to rotate within the ring gear in a similar fashion to the single planetary gear assembly. Said carrier mount would include dual planetary gears having differing gear segments, each with differing gear ratios, which are then selectively activated and driven by the sun gear to provide the desired output gear ratio. This dual planetary gear higher gear ratio segment, when activated, provides a gear ratio in excess of 3. The dual planetary gear lower gear ratio segment, when activated, provides a gear ratio between 2 and 3.

The two speed gearbox may be adapted to either reduce or increase outputs by reversing the gearbox input and output ends via universal end plate coupling structure adapted to attach either end of the gearbox assembly to the input drive shaft. These couplings are preferably splined to accommodate splined input and output shafts to prevent slippage. Thus adapted, either an increasing or decreasing torque output is provided by the two speed gearbox.

The two speed gearbox employs one stationary and one dynamic clutch to selectively activate either the ring gear or sun gear of the central planetary gear assembly and provides three modes of operation. The dynamic high speed clutch employs an angular contact bearing permitting the use of a stationary piston. As both pistons are in fixed relative positions, the pistons themselves do not require dynamic seals, which are subject to the extensive leakage problems encountered by other dynamic clutches. However, a dynamic seal is employed in the hydraulic high speed circuit to hydraulically activate the high speed clutch. Any leakage from this dynamic seal is minimized by employment of lower hydraulic pressures, and is collected within the housing and recirculated to aid in cooling.

Hydraulic or mechanical activating means, such as an hydrostatic drive system, are associated with the low speed and high speed clutch assemblies to selectively activate the desired clutch assembly to secure the desired sun gear or ring gear to provide the desired gear ratio drive output. The preferred hydrostatic drive system activates either piston forcing the high speed clutch plates to engage in a high speed mode and secure the clutch assembly to transfer torque directly from the input sun gear/shaft. To prevent slippage, an engaging/disengaging locking pin is employed when the high speed clutch is engaged. Thus, the two speed gear box includes means for selectively engaging each of the low speed and high speed clutches.

In the low range, the ring gear is locked to the gear casing via the low speed clutch. This provides a speed reduction of approximately 2:1 in the preferred embodiment from input to output through the planetary gear sets. When conditions are correct, the high range clutch can be applied and the low range clutch released. This frees up the planetary system and torque is transferred directly from the input sun gear/shaft through high clutch. The high speed clutch is applied through the apply pressure piston, and multiple clutch plates.

The apply system, pressure, piston size, and clutch plates must be designed with sufficient capacity to carry the maximum input load. This will always occur at low input speeds. At higher speeds, the horsepower equation applies:

$$\text{Horsepower} = \text{Torque} \times \text{RPM}/5252$$

As the RPM increases, torque must proportionally decrease at a set horsepower. The life of a thrust bearing is not an issue with the present design as the force FT developed by the oil pressure on the piston acts against the snap ring. As the piston and the snap ring are located in the planetary gear carrier, the force FT becomes the Carrier internal force and does not develop any thrust on the bearings in the gear box output flange as shown in FIG. 2. Consequently it is not necessary to incorporate a control system that decreases the apply pressure behind the high speed clutch apply piston by using conventional and well known technology to sense the RPM speed into the drive system.

This two speed gear box is particularly adapted for use in military vehicles where high speeds are required under extreme high desert temperatures. The greasing pits for the ball bearings and the tapered bearings lubrication are located in the gear box housing. These greasing pits are located on the both sides of the gear box housing in parallel with the pits of the clutch control as shown in the attached drawings. They provide the required bearing lubrication for all operation modes to minimize heat buildup and undue wear. In summary, the two speed gearbox thus provides a planetary gearbox assembly for use with any torque source. It may be adapted with an auxiliary gearbox having an input drive axle associated with the input coupling of two speed gearbox.

An auxiliary gearbox may be included with multiple parallel shafts, a plurality of input shafts, a gear shaft with interlocking gears and an output drive shaft each operably associated to multiply torque inputs. The input shafts are driven by a plurality of drive motors to provide combination inputs from multiple sources to the auxiliary gearbox, which then provides a combined output, which is inputted into the two speed gearbox. One embodiment of the preferred two speed gearbox associated with an auxiliary gearbox adapts the output shaft of the two speed gearbox with an output yoke. In another variation, the auxiliary gearbox is mounted normal the input drive axle of the two speed gearbox. This embodiment has the output drive shaft of the auxiliary gearbox mounted in line with the sun gear coupling of the two speed gearbox. The auxiliary drive shaft is operably associated with an in line engine mount and the shaft of a first drive motor. The auxiliary gearbox has another drive shaft off-set and operably associated with a second drive motor mounted parallel to the drive shaft of a second motor. In this preferred embodiment of the combination auxiliary gearbox and two speed gearbox, the first drive motor is a combustion engine, and the second drive motor is an electric motor? to provide multiple engine inputs to the two speed gearbox.

In summary, the two speed gearbox connects to an axle operatively driven by a torque source associated with its sun gear of a central planetary gearing system via coupling means. Means for shifting from the first mode low gear ratio mode to a second high gear ratio mode are included via selective application of the low and high speed clutches to secure either the sun gear and/or the ring gear of the central planetary gearing system to provide a plurality of geared outputs relative to the torque inputs. Where additional torque ratios are required, an auxiliary gearbox may be included to provide the required input into the two speed gearbox from multiple drive sources.

DESCRIPTION OF THE ILLUSTRATED EMBODIMENTS

Figure 3:
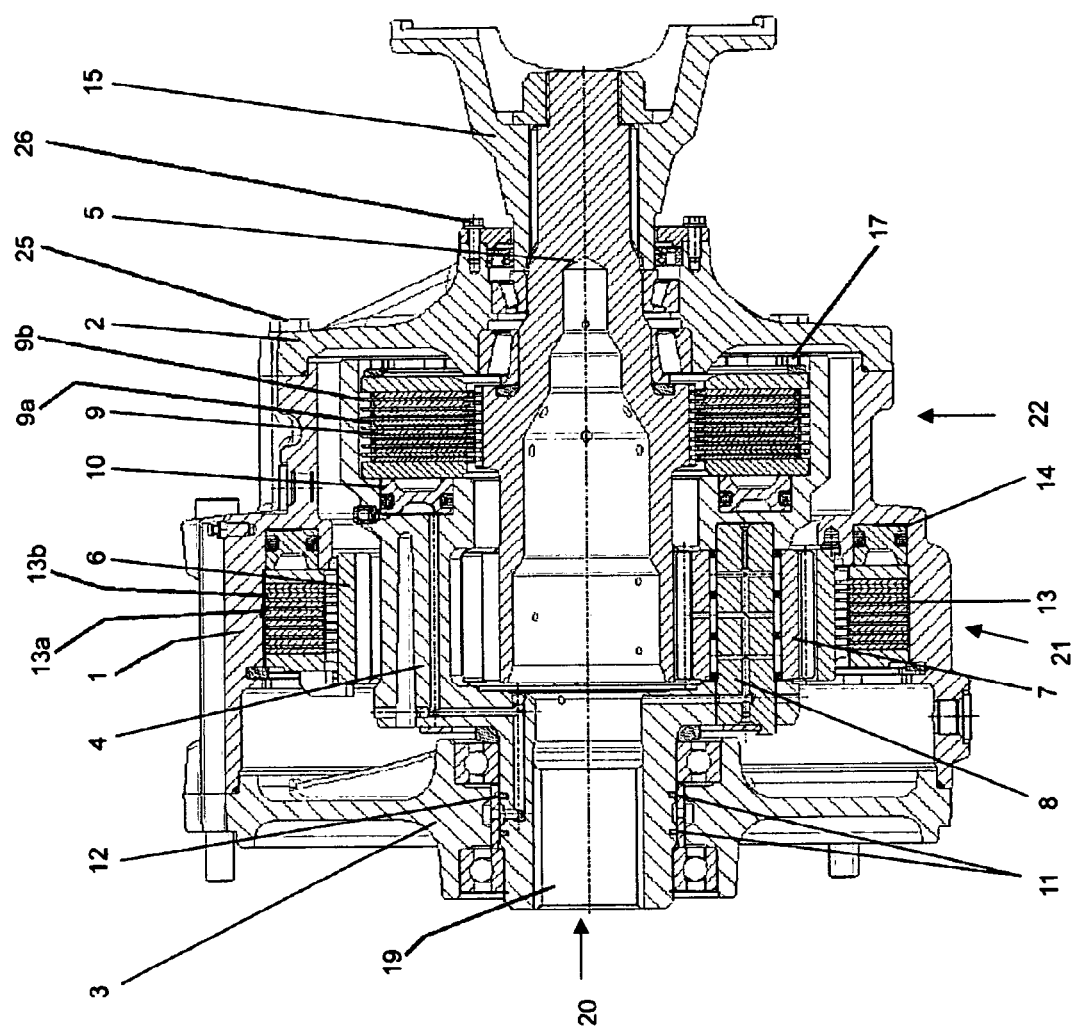
FIG. 3 is a side cross sectional view of the two speed gear box shown in FIG. 2.
Figure 4:
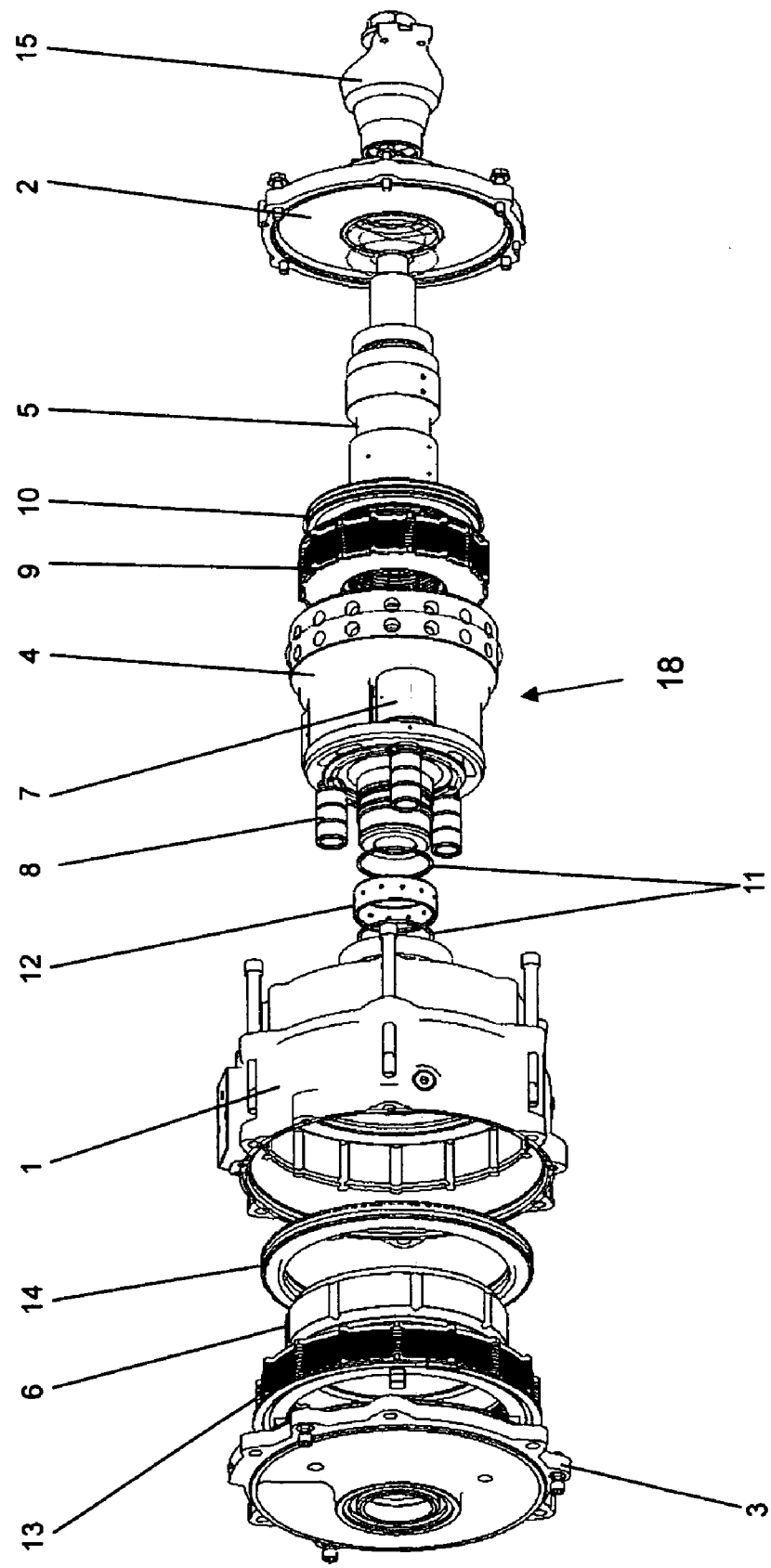
FIG. 4 is an exploded view of the embodiment of FIG. 3.

FIG. 3 is side cross sectional view of an assembled preferred embodiment of the two speed gearbox of the present invention. The two speed gearbox is for use with any device that receives a torque input and provides a torque output usually under high speeds and high temperature operating conditions. The following is the list of parts of the preferred embodiment shown in FIG. 3:

1) Gear Housing
2) Flange Front
3) Flange Back
4) Planet Carrier
5) Planet Sun Gear
6) Planet Ring Gear
7) Planet Gears
8) Planet Pins
9) High Speed Clutch (Pack with static discs 9a, rotating friction discs 9b)
10) High Speed Clutch Piston (Pack)
11) High Speed Clutch Dynamic Seal
12) High Speed Clutch Dynamic Seal Bushing
13) Low Speed Clutch (Pack-Static with static discs 13a, static friction discs 13b)
14) Low Speed Clutch Piston (Pack)
15) Driveline Yoke
16) Flange Front Hydrostatic Input
17) Snap Ring
18) Central Planetary Gear Assembly
19) Drive Shaft
20) Two Speed Gear Box Assembly
21) Low Speed Clutch Assembly
22) High Speed Clutch Assembly
23) O-ring
24) Retaining ring
25) Hex soc. Cap screws
26) Hex soc. Cap screws FIG. 4 is an exploded view of the embodiment of FIG. 3 showing the components of the two speed gear box 20. The two speed gearbox 20 contains a central planetary gear assembly 18 aligned with an input drive shaft 19 shown in FIG. 3. The central planetary gear assembly 18 labeled in FIG. 4 includes a sun gear subassembly 5, a number of planetary gears 7 arranged to provide dual gear ratios, a planetary gear carrier 4, and a ring gear 6. The low speed clutch assembly 21 is attached to the gear housing 1 and secures the ring gear 6 via the low speed clutch pack 13 with static discs 13a affixed to the ring gear 6 and corresponding compression discs 13b attached to the housing 1, when activated. The low speed clutch assembly 21 comprises a disc pack 13 with a plurality of non friction non rotating static clutch static discs 13a attached to the gear casing 1 and operatively associated with corresponding rotating friction clutch discs 13b attached to the ring gear 6 to secure the ring gear 6 to the gear casing 1 when activated by the low speed clutch piston 14 comprised of an hydraulically powered spring return piston. Thus secured, as each of the planetary gears 7 rotate about its own rotational axis, the planetary gears 6 also translate their rotation about the axis of the sun gear 5.

The components of central planetary gear assembly 18 are selectively activated by low and high speed clutch assemblies 21, 22 to alter the torque input from a drive shaft 19 rotatably aligned with the central planetary gear assembly 18. Said central planetary gear assembly 18 shown in FIGS. 3 and 4 provides two geared outputs via planetary gears 5, 6, 7 in three selectable operating modes. The central planetary gear assembly 18 and part of the high speed clutch planet carrier 4 are housed in a carrier 4 shown in more detail in FIGS. 3 and 4. The central planetary gear assembly 18 has a generally cylindrical inside surface, within which the ring gear 6 of the planetary gear assembly 18 rotates until the low speed clutch assembly 21 is activated. A flange front mount subassembly 2 shown in more detail in FIG. 3 secures the end of the two speed gear box 20. A flange back full mount subassembly 3 secures the other end of the two speed gear box 20. Said subassembly components are secured together via a variety of interconnecting parts and components as shown in FIG. 3: O-ring 23, retaining ring 24, hex soc. Cap screws 25 (mounts the 2 speed gearbox to the axle), hex soc. Cap screws 26 (holds the 2 speed gearbox assembly together).

The high speed clutch assembly 22 comprises a high speed clutch disc pack 9 with a plurality of non friction non-rotating static clutch discs 9a attached to the planetary gear carrier 4 and operatively associated with rotating friction clutch discs 9b attached to the sun gear 5 to secure the sun gear 5 to the carrier 4 when activated by an hydraulically powered spring return piston 10. With the sun gear 5 secured, the drive shaft 22 rotates the planetary gears 7 to rotate the ring gear 6 to provide high speed torque rotation of the output drove line yoke 15. Snap rings 17 are included for stability. Thus, as each of the planetary gears 7 rotate about its own rotational axis, the planetary gears 7 also translate their rotation about the axis of the sun gear 5.

Figure 5:
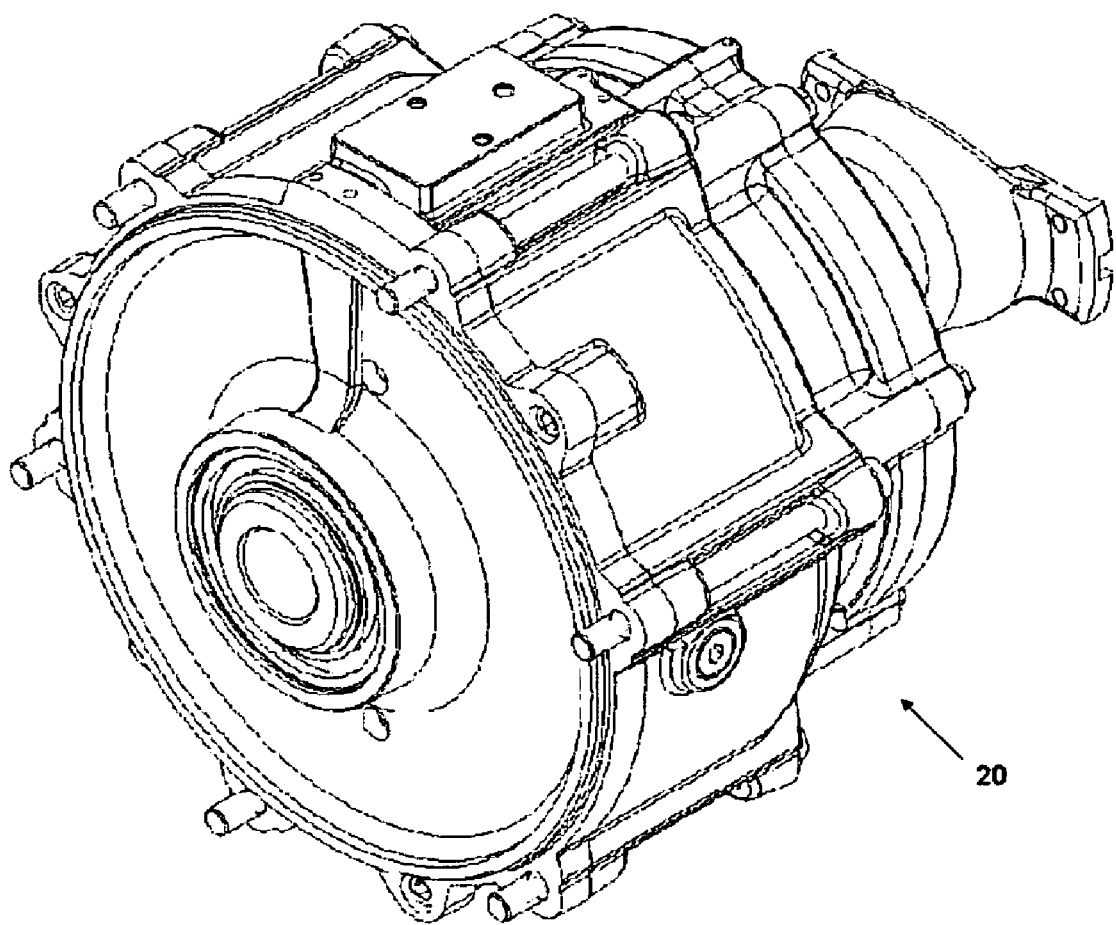
FIG. 5 is an assembled view of the embodiment of FIG. 4.

FIG. 5 is a perspective view of the assembled two speed gearbox of the embodiments shown in FIGS. 3 and 4.

Figure 6:
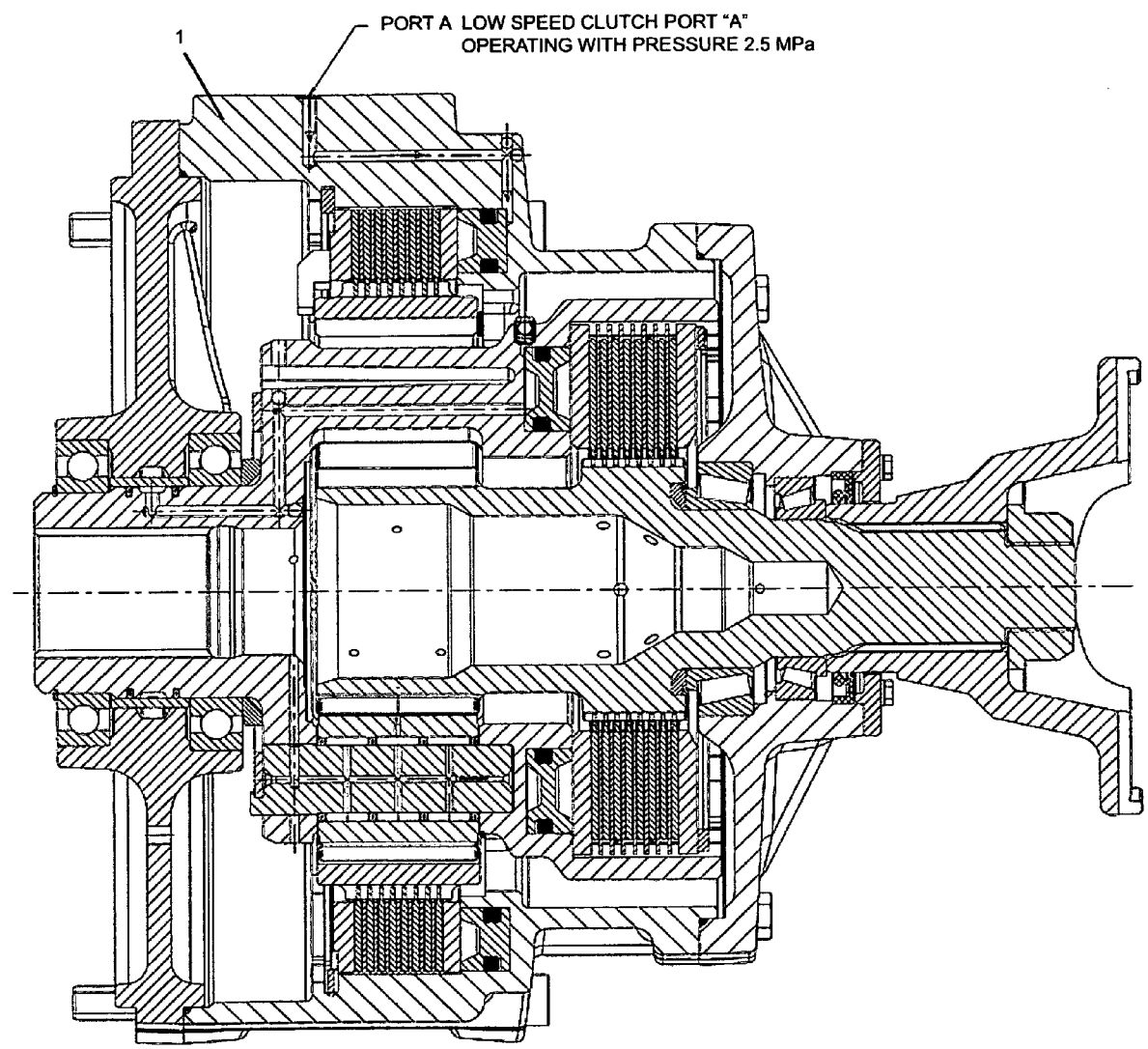
FIG. 6 is a cross sectional view of the low speed clutch hydraulic activation system.

FIG. 6 is a cross sectional view of the low speed clutch hydraulic activation system. Port A low speed clutch port shows the hydraulic fluid path activating the low speed clutch piston 14 mounted on the housing 1, onto which the low speed clutch 13 is mounted and activated by the low speed clutch piston 14. The low speed clutch 13 is aligned with the planet ring gear 6, such that when it is activated, it secures the planet ring gear 6 such that the planetary gears 7 orbit the sun gear 5 and drive the gear carrier 4 together about the pivot axis of the sun gear 5. When the planetary gears 7 orbit the sun gear 5, each of the planetary gears 7 rotates about its own pivot axis 8 as the planetary gear carrier 4 rotates on the sun gear 5 axis. As the low speed piston 14 for the low speed clutch assembly 21 is stationary, it does not require dynamic seals.

Figure 7:
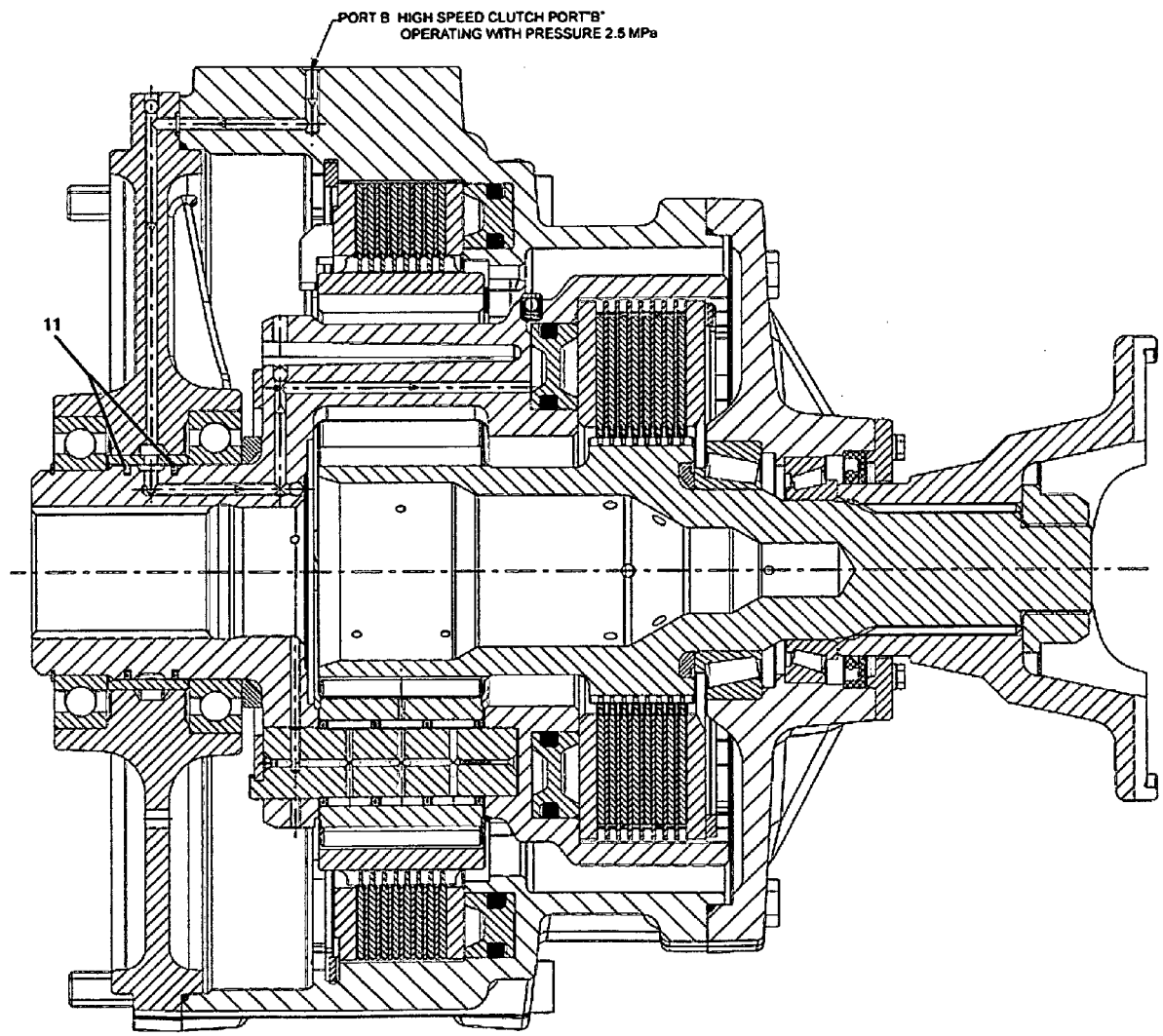
FIG. 7 is a cross sectional view of the high speed clutch hydraulic activation system.

FIG. 7 is a cross sectional view of the high speed clutch hydraulic activation system. Port B high speed clutch port shows the hydraulic fluid path activating the high speed clutch piston 10 mounted on the planetary gear carrier 4 to activate the high speed clutch 9. Dynamic seals 11, are employed to transmit hydraulic fluid to passageways on the planetary gear carrier 4 as shown. Any leakage is collected within the housing and recirculated to assist in cooling the gear box assembly.

Thus, the two speed gear box 20 operates as follows:

The sun gear 5 receives torque input from the drive axle 19 (unaffected by the high speed clutch 10). The ring gear 6 is rotatably mounted within the planet carrier 4 and supported on bearings in a conventional manner. By virtue of the high speed clutch 9, rotation of the drive axle 18 may be transmitted through the planet carrier 4. When the high speed clutch 9 is disengaged and the low speed clutch 13 is engaged, rotation of the sun gear 5 via torque input from the drive axle 22 causes the planetary gears 6 to orbit about the sun gear 5. By virtue of the planet carrier 4, this orbital motion causes rotation around the sun gear 5.

The low speed clutch 13 holds the ring gear 6 in a fixed position. Rotation of the sun gear 5 in turn rotates the planetary gears 7. Because the planet carrier 4 is fixed, the planetary gears 7 rotate about their respective axes and orbit about the sun gear 5. The rotation of the planetary gears 7 is transmitted to the output shaft via the ring gear 6. In this mode of operation, there is an increase in gear ratio, which drives the output drive line yoke 15 at a relatively low speed with relatively high driving torque.

In another mode of operation, the low speed clutch assembly 21 is disengaged, and the high speed clutch assembly 22 is engaged. Rotation of the sun gear 5 via the drive axle 19 is transmitted directly to the planet carrier 4, which is free to rotate on bearings about the drive axis (because the low speed clutch 13 is disengaged). The high speed clutch 12 couples the planet carrier 4 to the sun gear 5 when the high speed clutch 12 is engaged. Thus, as the sun gear 5 rotates, the planetary gears 7 translate about the drive axis in conjunction with the rotation of the sun gear 5. The planetary gears 7 do not rotate about their respective axes. By virtue of the planet carrier 4 attached to the planetary gears 7, the translation of the planetary gears 7 is transmitted from the sun gear 5 via the shaft axle 19. In turn, rotation of the sun gear 5 rotates the planetary gears 7, thus rotating the output driveline yoke 15. In this mode of operation, there is no gear reduction, resulting in a relatively high speed and lower torque transmission to the output driveline yoke 15. With both clutch assemblies 26, 28 disengaged, a neutral mode results as the output driveline yoke 15 is freely rotatable with respect to the drive axle 22.

Thus, selectively engaging and disengaging the clutch assemblies 21 and 22 provides two speed gear ratios (low and high) and three modes of operation for the output driveline yoke 15 relative to the drive axle 19.

Based on size constrains and planetary gear equations, which are well known in the art, the speed reduction and torque increase ratios through the two speed gear box 20 are selected based on gear teeth ratios:

$$\frac{NR2}{NS2}$$

Where:
NR2 is the number of gear teeth on the ring gear 6
NS2 is the number of gear teeth on the sun gear 5.

If these gear ratios are not sufficient to provide the desired outputs, double planet carriers 4 may be included to provide a 3:65 to 1 gearbox ratio. If loads are not significant in an application, additional planet carriers 4 may be included.

The two speed gearbox 20 may be associated with any torque drive source. However, the preferred embodiment with the two speed gearbox operably associated with an hydraulic motor.

Thus, the possible reduction ratios for the two speed gear box 20 range from a gear ratio between 2 and 3 when a double planetary gear assembly 24 (not shown) is employed. For lower gear ratios greater than 3, the two speed gear box employs a single planetary assembly 18.

If this is still not sufficient to provide the desired two speed gearbox operating ratios, an auxiliary gearbox may be included to adjust the drive shaft inputs from various sources.

The low speed clutch 13 and/or the high speed clutch 10 may be engaged automatically or manually. Preferably, the low speed gear ratio and the high speed gear ratio are activated automatically. Automatic shifting of the two speed gear box 20 into high speed or low speed gear ratios may require information on speed and torque status of the drive. An electronic controller (not shown) may receive input data on engine throttle, vehicle speed, engine speed, vehicle load, wheel traction, terrain topography, the torque and speed status of the other wheels, and perhaps various other parameters to determine shifting the two speed gear box 20 from high speed to low speed and vice versa when required. The electronic controller then transmits shifting commands to actuators to engage or disengage the low speed clutch 13 and/or the high speed clutch 10 to shift the two speed gear box 20 into the desired gear ratio. The clutch assemblies 26, 28 are actuated by methods well known in the art, such as but not limited to, hydraulic or electro-mechanical actuation.

The disclosed two speed two speed gear box 20 provides a cost effective way to extend the torque and speed range of mechanical, hydrostatic and electric drives. In particular, the two speed gear box 20 is well suited to hydrostatic and electric drives because such drives can change the direction of rotation of the drive shafts without requiring a reverse shifting mechanism. The applications in which the disclosed two speed gearbox 10 can be used range from small appliances to large industrial vehicles. The potential applications of the disclosed two speed gear box 20 include, by way of example rather than limitation, domestic appliances such as sink mounted garbage disposal units, food blenders, and power tools; industrial applications such as winches, hoists, and material handling equipment; and, vehicle applications such a golf buggies, agricultural tractors, earthmoving equipment, forklifts, and personnel carriers.

Figure 1:
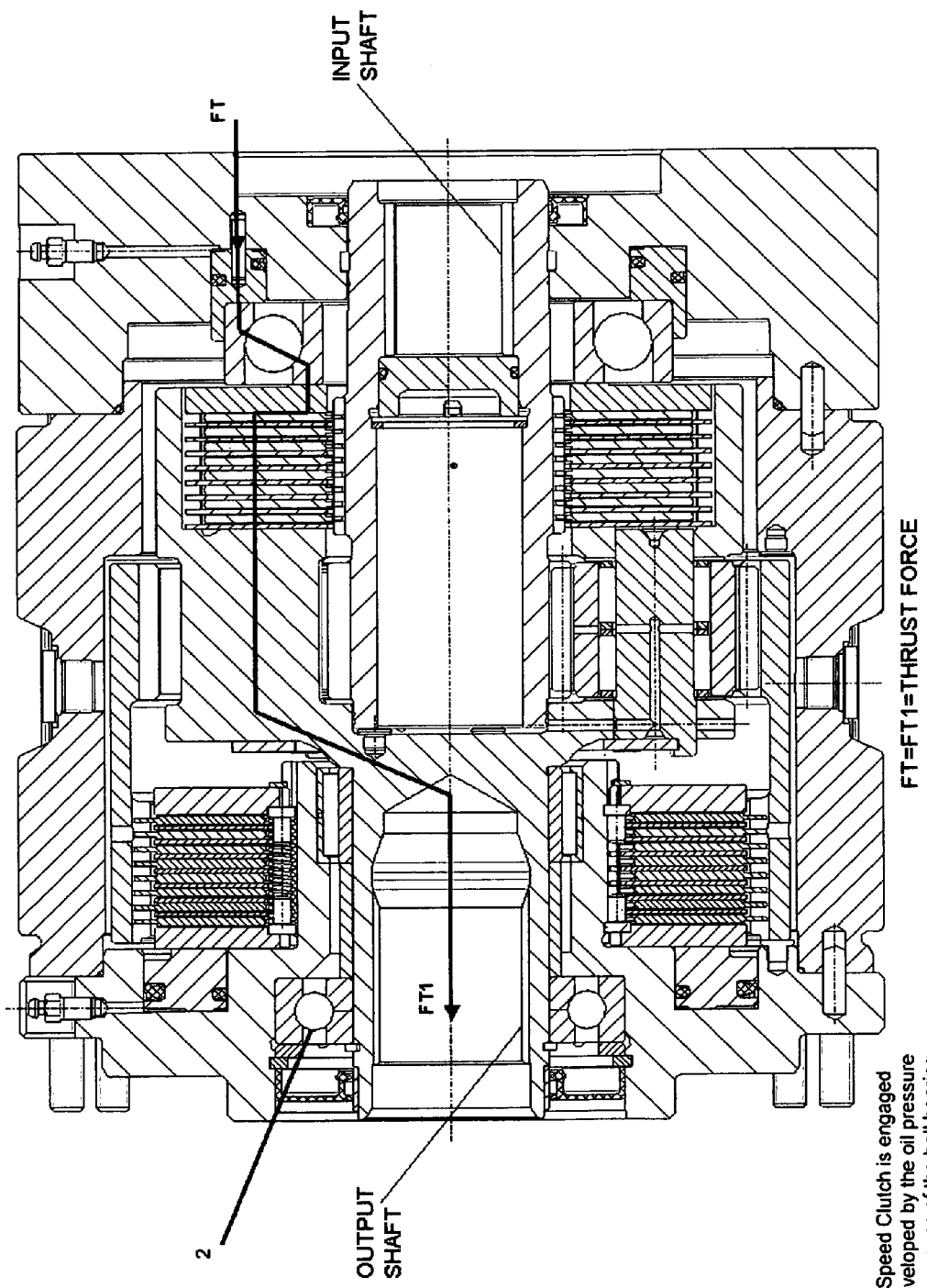
FIG. 1 is a force diagram for a two speed gear box.
Figure 2:
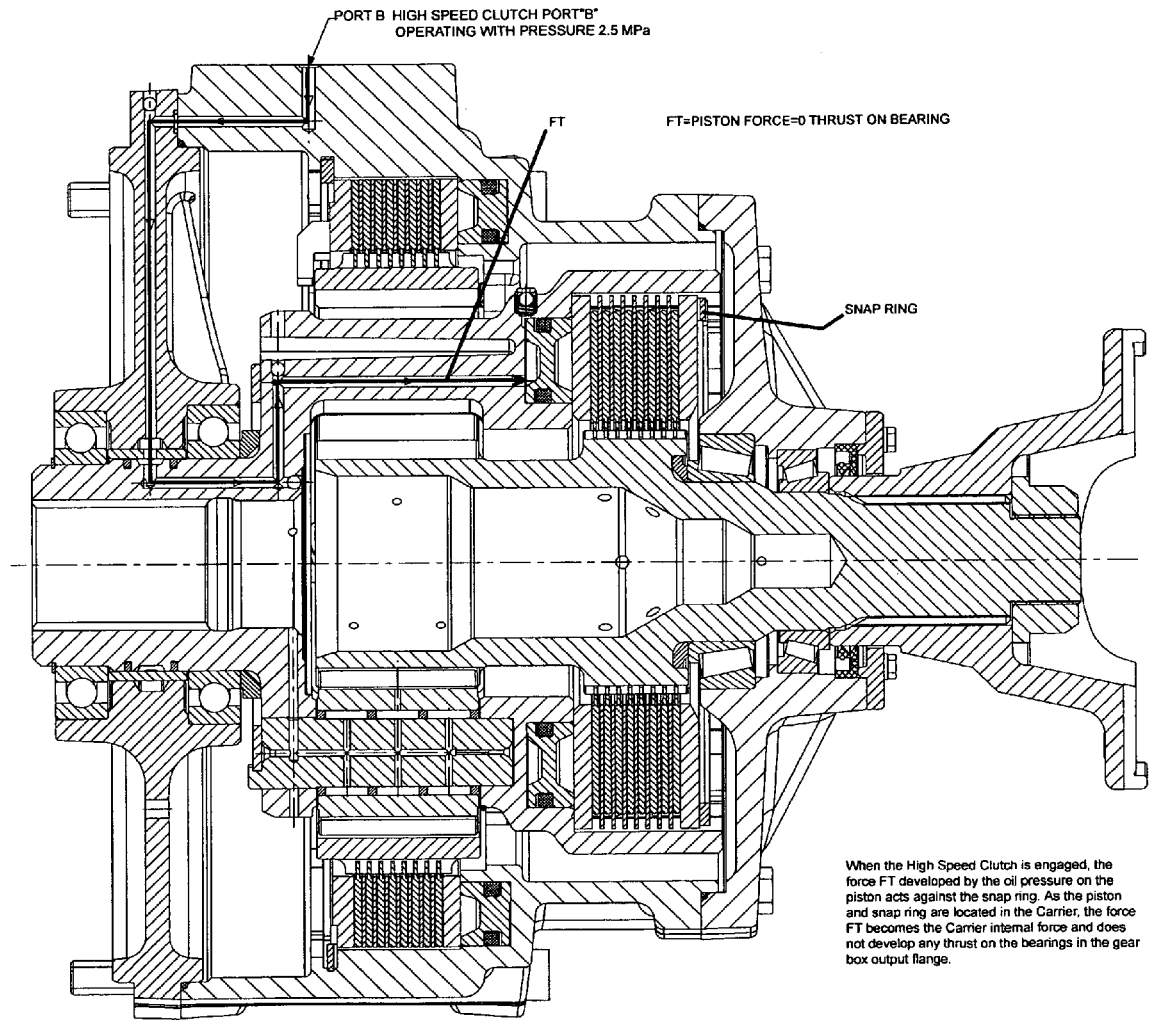
FIG. 2 is a force diagram for the present two speed gear box
Figure 8:
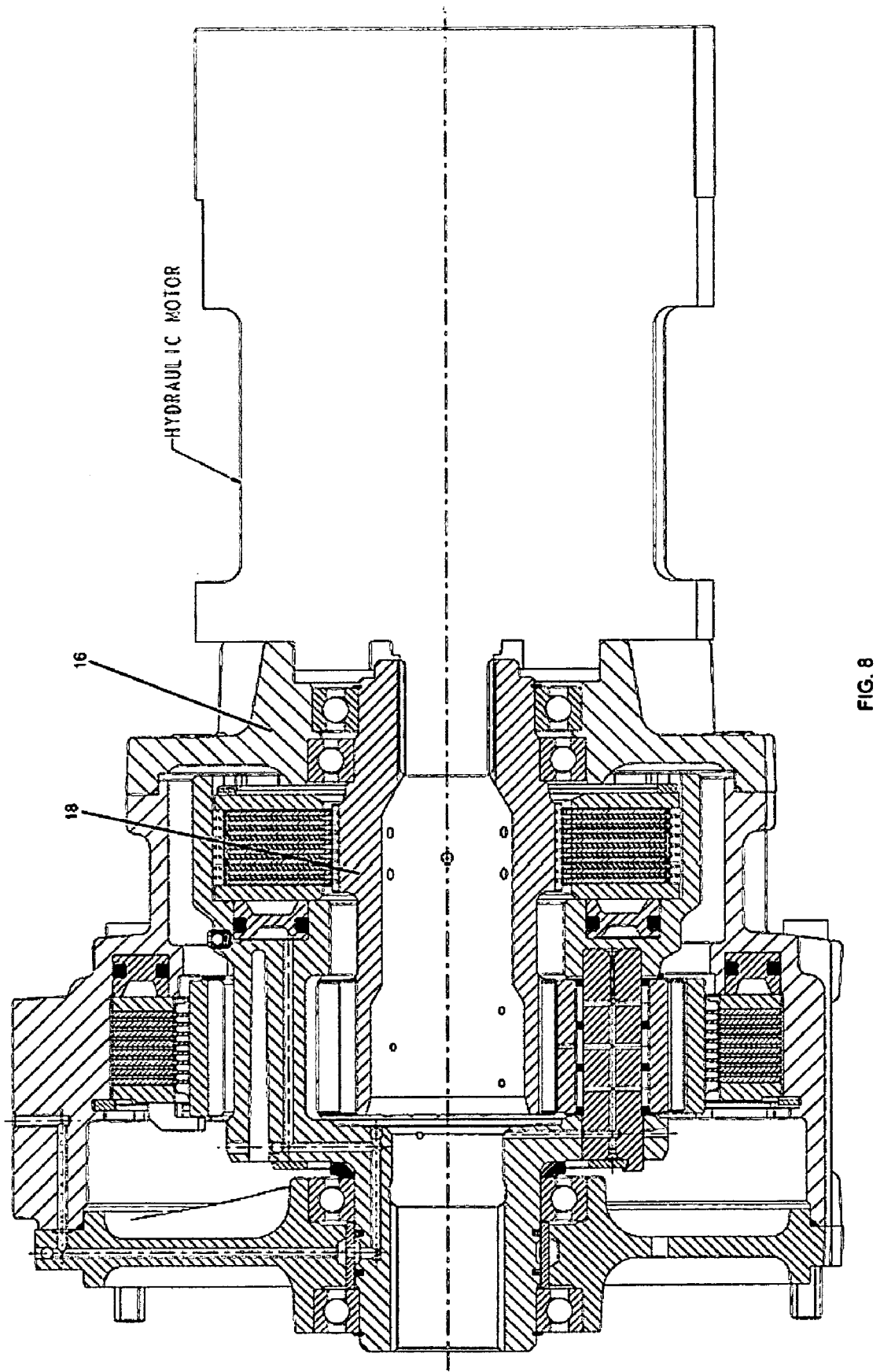
FIG. 8 is a side cross sectional view of the two speed gear box shown in FIG. 2 attached to an hydraulic motor.

FIG. 8 is a side cross sectional view of the two speed gear box shown in FIG. 2 operably driven by an hydraulic motor. Application of the disclosed two speed gear box 20 to hydrostatic drive systems may offer certain operational advantages due to the fact that many such drive systems have a limited torque and speed range. Some of the advantages of hydrostatic drive systems include for example, the ability to provide a wide range of speed/torque variation over their operating range, while the prime mover or engine runs at its most efficient constant speed. Further, such drive systems may operate in reverse at a controlled speed and remain unaffected by output loads, and may respond more rapidly than mechanical or electrical transmissions with comparable power ratings. However, hydrostatic drive systems have a limited speed/torque range compared to multi-ratio mechanical transmissions. The practical limit of the speed/torque range for hydrostatic drive systems is 9:1, where vehicle applications typically require a speed/torque range of 15:1.

This universal two speed gearbox is particularly suited for use with vehicles driven at high speeds under high temperature operating conditions, but can also be used with other devices which require variable operating two speed bearing thrust.

The foregoing description of the illustrated embodiments is not intended to limit the scope of the appended claims. The claims themselves contain those features deemed essential to the invention.

We claim:

1. A two speed gearbox mounted in-line for driving a hub, the gear box comprising:
    a gearbox casing adapted to journal mount about an input drive shaft and output shaft;
    a central planetary gear carrier assembly rotatably mounted within the gearbox casing comprising:
        a sun gear to accommodate and be driven by the input drive shaft;
        a plurality of planetary gears;
        a ring gear with structure to accommodate and drive the output shaft;
        a planetary gear carrier, the planetary gear carrier supporting and interconnecting the planetary gears;
    a low speed clutch assembly with a plurality of fixed discs mounted to the gearbox casing adapted to selectively engage a plurality of rotating discs there between attached to the ring gear of the planetary gear carrier assembly;
    a high speed clutch assembly with a plurality of fixed discs mounted on the carrier mount adapted to selectively engage a plurality of rotating discs there between attached to the sun gear of the planetary gear carrier assembly;
    an engaging/disengaging high speed hydraulically powered spring return piston located on the planetary gear carrier and operably associated with the high speed clutch assembly;
    an engaging/disengaging low speed hydraulically powered spring return piston attached to the gearbox casing and operably associated with the low speed clutch assembly to selectively hydraulically secure the ring of the planetary gear assembly in a low operating range, when engaged; and
    hydraulic activation means to selectively activate the desired high speed and low speed hydraulically powered spring return pistons to provide the desired operating speed mode having a dynamic hydraulic valve circuit with passageways in the gearbox surrounding the planetary gear carrier joined with a dynamic seal surrounding corresponding passageways in the planetary gear carrier in communication with the high speed and low speed hydraulically powered spring return pistons, said hydraulic valve circuit adapted to hydraulically activate the low speed hydraulically powered spring return piston selectively to engage the ring gear of the planetary gear carrier assembly in a low operating range, when activated; and to hydraulically activate the high speed hydraulically powered spring return piston selectively to engage the sun gear of the planetary gear carrier assembly in a high operating range when activated.

2. The two speed gearbox of claim 1 wherein the dynamic seal comprises a pair of dynamic seals surrounding a groove in the planetary gear carrier in communication wit passageways in the carrier,
    a sleeve with a plurality of hydraulic ports surrounding and in rotatable contact with the pair of dynamic seals, and
    a second pair of dynamic seals surrounding the sleeve on both sides of the hydraulic ports, which are in dynamic contact with the surrounding planetary gear carrier.

3. The two speed gear box of claim 1, wherein at least one of the low speed clutch assembly and the high speed clutch assembly is adapted to be engaged and disengaged automatically.

4. The two speed gearbox of claim 1, wherein the planetary gear carrier has a single planetary gear assembly (simple planetary) which provides a gear ratio greater than 3:1.

5. The two speed gearbox of claim 1, wherein the plurality of planetary gears of the central planetary gear carrier assembly are operatively connected to the sun gear of the planetary gear assembly, such that the sun gear rotates about a drive axis in conjunction with the gear carrier of the planetary gear assembly.

6. The two speed gearbox of claim 1, including an auxiliary gearbox having an auxiliary gearbox output shaft associated with a two speed gearbox input drive shaft sun gear coupling and multiple auxiliary gearbox input drive shafts with interlocking gears operably associated with a plurality of drive motors to provide combination inputs from multiple drive sources to the auxiliary gearbox output shaft driving the two speed gearbox sun gear coupling.

7. The two speed gearbox of claim 1, wherein the planetary gear carrier assembly defines a plurality of operating modes comprising:

a neutral mode defined by disengaging the low speed clutch assembly and the high speed clutch assembly;

a low speed mode defined by engaging the low speed clutch assembly and disengaging the high speed clutch assembly; and a high speed mode defined by disengaging the low speed clutch assembly and engaging the high speed clutch assembly.

8. The two speed gearbox of claim 7, including a control system associated with the activation means that decreases apply pressure behind the high speed hydraulically powered spring return piston, and bearings associated with the clutch assemblies wherein thrust load through the bearings associated with the high speed clutch assembly is directly proportional to torque input.

9. The two speed gearbox of claim 1, including a first carrier mount assembly which houses the planetary gear assembly and the high speed clutch assembly.

10. The two speed gearbox of claim 9, wherein the first carrier mount assembly includes a generally cylindrical interior surface, a portion of the interior surface defining the ring gear of the planetary gear assembly.

11. The two speed gearbox of claim 1, including universal face plates with couplings attached at either end of the gear box assembly adapted to connect either end of the gear box with a splined drive shaft to provide either an increasing or decreasing torque output to the output shaft.

12. The two speed gearbox or claim 11, wherein the output shaft of the two speed gearbox is an output yoke.

* * * * *